United States Patent
Sugaya et al.

(10) Patent No.: US 6,490,459 B1
(45) Date of Patent: Dec. 3, 2002

(54) COMMUNICATION CONTROL METHOD AND TRANSMISSION APPARATUS

(75) Inventors: Shigeru Sugaya, Kanagawa (JP); Hidemasa Yoshida, Chiba (JP); Takanobu Kamo, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/391,520

(22) Filed: Sep. 8, 1999

(30) Foreign Application Priority Data

Sep. 11, 1998 (JP) .......................................... 10-258856

(51) Int. Cl.[7] .............................. H04Q 7/20; H04Q 7/12
(52) U.S. Cl. ...................... 455/517; 455/11.1; 455/458; 455/16; 455/500; 455/456; 370/226; 375/211
(58) Field of Search .................. 455/11.1, 458, 455/456, 422, 16, 500, 503, 7, 426, 517, 510, 13.1, 59, 60, 61; 370/226; 375/211; 340/7.27, 7.26

(56) References Cited

U.S. PATENT DOCUMENTS 5,128,934 A * 7/1992 Jasinski ...................... 455/503
5,355,511 A * 10/1994 Hantano et al. ........... 455/11.1
6,141,533 A * 10/2000 Wilson et al. ............. 455/11.1

* cited by examiner

*Primary Examiner*—William Trost
*Assistant Examiner*—Keith Ferguson
(74) *Attorney, Agent, or Firm*—Jay H. Maioli (57) ABSTRACT

When an access of wireless communication among a plurality of communication stations is polling-controlled by a control station, polling control information is transmitted to a specific communication station incapable of directly making wireless communication with the control station by relaying a predetermined communication station, whereby a station incapable of directly making communication with a control station can be controlled satisfactorily when control in a network system is controlled by the control station.

7 Claims, 10 Drawing Sheets

FIG. 5B Substitutive Polling (#3 ⇨ #7)

FIG. 5A Relay Polling (#0 ⇨ #3)

FIG. 5D Response End Notification (#3 ⇨ #0)

FIG. 5C Polling Response (#7 ⇨ #3)

COMMUNICATION CONTROL METHOD AND TRANSMISSION APPARATUS

BACKGROUND OF THE INVENTION

1. Field of the Invention

The present invention relates to a communication control method preferably applied when various information is transmitted by means of a wireless signal, for example, to construct a local area network (LAN) among a plurality of devices, and a transmission apparatus using this control method.

2. Description of the Related Art

Conventionally, in a relatively small range such as home or office, when a local area network is constructed among a plurality of apparatuses such as various video apparatuses, personal computer machine, or its periphery so as to transmit data handled by these apparatuses, a wireless signal transmitter/receiver (a wireless transmission apparatus) is connected to each apparatus so as to enable data transmission through wireless transmission, instead of direct connection among apparatuses via a signal line.

A local area network is constructed through wireless transmission, thereby making it possible to simplify a system configuration without requiring direct connection among apparatuses via a signal line or the like.

In the meantime, in the case where a local area network is constructed by using a plurality of wireless transmission apparatuses, if signals are transmitted simultaneously from a plurality of transmission apparatuses using a same transmission bandwidth, a transmission error may occur. Thus, communication among transmission apparatuses in the network is required to access-control by means of any method.

As a conventionally known access control method, for example, in a small scale wireless network, there is exemplified a method for integrally managing communication among transmission apparatuses (nodes) in the network by means of a transmission apparatus (a route node) serving as a central part using start-type connection. Specifically, processing for controlling data transmission from other transmission apparatuses is achieved by means of polling control from the transmission apparatus of a central part, for example.

However, to perform transmission processing using such star-type connection, it is presumed that a transmission apparatus serving as a central control station performing processing for transmission control is capable of performing wireless communication directly with all other transmission apparatuses in a network system. Therefore, there has been a problem that a wireless communication network construction range is limited within the range capable of directly making communication with the central control station; and the thus constructed network is available in a limited range, which depends on a transmission output of an electric wave of the central control station.

In addition, during transmission control processing using star-type connection, with respect to transmission control or network management also, in the case where direct communication with the central control station is disabled, it has been necessary to disconnect an invalid transmission apparatus from the network. Therefore, there has been a problem that, in the case where a mobile station movable in the network is admitted as a transmission apparatus, control by the central control station becomes very complicated. That is, for the central control station to grasp a position of the mobile station, it has been necessary to transmit and receive a signal for connection check at a short period, and frequently supervise a connection state among the central control station and the mobile station.

To solve these problems, for example, it is considered to construct a distributed network configuration in which communication is made only among stations capable of performing direct communication instead of predetermination of the central control station. In this distributed network, if a remote station is distant, it is required to transmit data by relaying a number of stations. Every time such relaying is performed, it is required to perform processing for transmission start with a remote station for communication. As a result, there has been a problem that data transmission is delayed every time the number of steps performing relaying is increased. There has been another problem that a good transmission state cannot be obtained unlike a case in which integrated communication management from a central control station is performed as in polling control.

SUMMARY OF THE INVENTION

It is an object of the present invention to well control a station incapable of directly making communication with a control station in the case where an attempt is made to control communication in a network system by means of the control station.

In a communication control method according to the present invention, when an access of wireless communication among a plurality of communication stations is polling-controlled by a control station, polling control information is transmitted to a specific communication station incapable of directly making wireless communication with the control station by relaying a predetermined communication station.

According to this communication control method, polling control information can be transmitted to a communication station incapable of directly making communication with a control station.

A transmission apparatus according to the present invention comprising:

receiving means for receiving polling control information to be transmitted from a control apparatus;

storing means for temporarily storing the received polling control information by the receiving means; and transmitting means for relay-transmitting the stored polling control information by the storing means to a specific transmission apparatus.

According to this transmission apparatus, the received polling control information by the receiving means can be relay-transmitted from the transmitting means to another transmitting apparatus.

DETAILED DESCRIPTION OF THE PREFERRED EMBODIMENT

Hereinafter, an embodiment of the present invention will be described with reference to FIG. 1 to FIG. 10.

Figure 1:
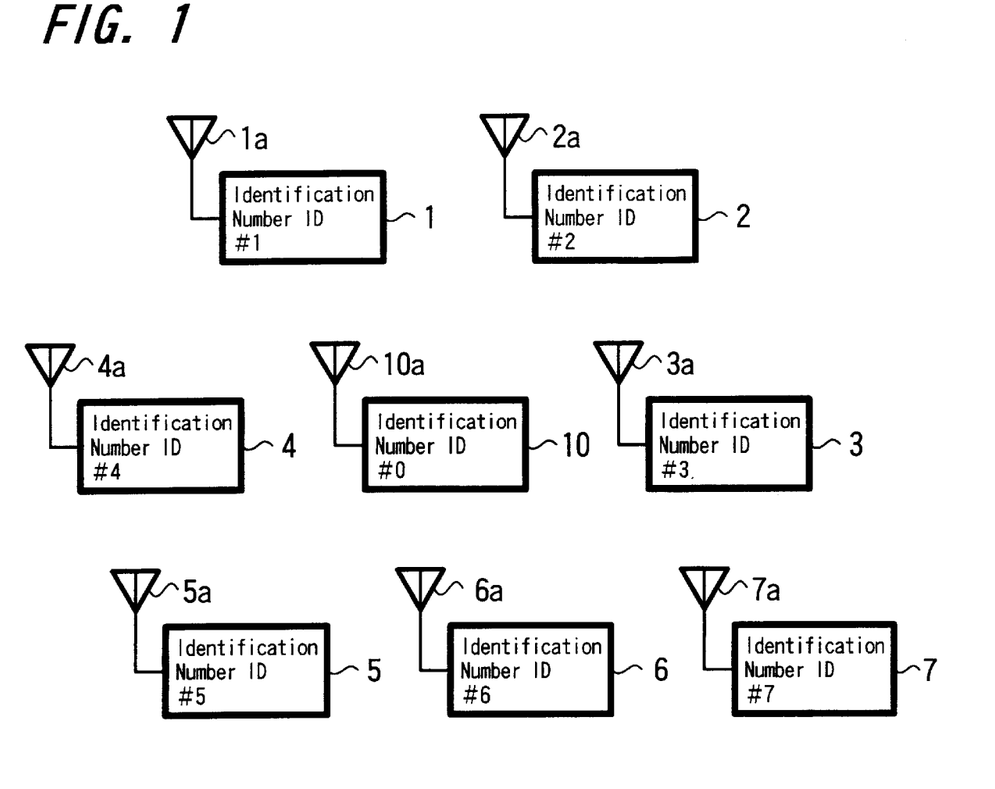
FIG. 1 is a structural view showing an example of a communication system according to one embodiment of the present invention.

In this embodiment, the present invention is applied to a network system constructed as a system for transmitting and receiving video data, voice data, or computer-use data at home or in a relatively small station or the like. Now, a system configuration of this embodiment will be described with reference to FIG. 1. In the network system of this embodiment, the maximum number of wireless transmission apparatuses configuring the network is predetermined. For example, a maximum of 16 wireless transmission apparatuses are available to construct the network. FIG. 1 shows a state in which eight wireless transmission apparatuses 1 to 7 and 10 are allocated. To each of these transmission apparatuses 1 to 7 and 10, antennas 1a to 7a and 10a are connected to perform transmission and receiving. To each of the wireless transmission apparatuses 1 to 7 and 10, various processing apparatuses (not shown) such as a video signal reproducing apparatus, a monitor apparatus, a computer machine, and a printer apparatus are individually connected. In the case where data transmission is required among these processing apparatuses, data is transmitted via a connected wireless transmission apparatus.

The eight wireless transmission apparatuses 1 to 7 and 10 each function as a node that is a communication stations, and each apparatus is assigned identification number ID individually in advance. That is, the transmission apparatus 10 is assigned #0 as its identification number ID, and the transmission apparatuses 1 to 7 are assigned identification number ID from #1 to #7 in order.

In this case, a system configuration is such that an arbitrary wireless transmission apparatus in a network system is set as a route node functioning as a central control station, and wireless communication among nodes is executed by means of polling control from this control station. Basically, it is ideal that a wireless transmission apparatus allocated at a position capable of directly making wireless communication with all communication stations in the system. In this embodiment, however, a case in which any communication station is incapable of directly making wireless communication with a control station is also permitted. Here, a so-called star type connection configuration is such that a wireless transmission apparatus 10 whose identification number ID is #0 allocated at the substantially center in the network system is defined as a central control station, and another peripheral communication station is controlled from this central route node. In the foregoing description, when a communication station is merely referred to as, it is assumed to be inclusive of a central control station.

Here in this embodiment, the wireless transmission apparatus 7 whose identification number ID is #7 is arranged at a position incapable of directly making wireless communication with the wireless transmission apparatus 10 that is a central control station thereof. The wireless transmission apparatus 7 is arranged at a position capable of directly making communication among the wireless transmission apparatuses 3 and 6 whose identification numbers IDs are #3 and #6, respectively.

Figure 2:
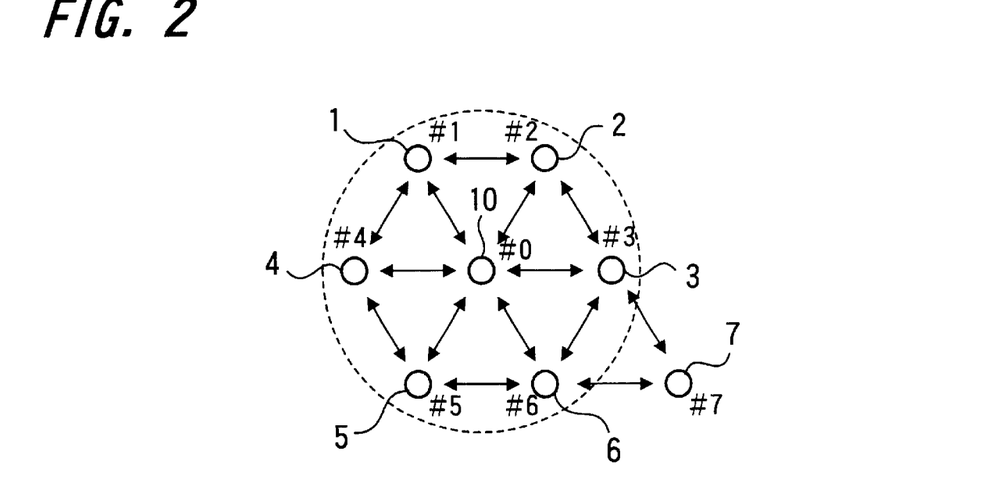
FIG. 2 is an illustrative view showing an example of a physical topology map according to one embodiment of the present invention.

FIG. 2 is a view showing a physical topology map that presents a communication state among stations when each communication station and the control station is this embodiment are arranged, wherein direct communication is enabled among connected communication stations indicated by the arrow. In the figure, communication stations 1 to 7 and 10 each capable of directly making communication with adjacently positioned communication stations. For example, communication station 1 whose identification number ID is #1 is capable of directly making communication with communication stations 2, 4, and 10 whose identification number IDs are #2, #4, and #0, which are arranged at the periphery of communication station 1. This applies to the other communication stations; and a communication station (a control station) arranged at a substantial center is capable of directly making communication with all of communication stations 1 to 6 other than communication station 7 whose identification number ID is #7. In the case where communication is performed among communication stations incapable of directly making communication, transmission processing is performed by other communication stations by relaying transmission data.

Figure 3:
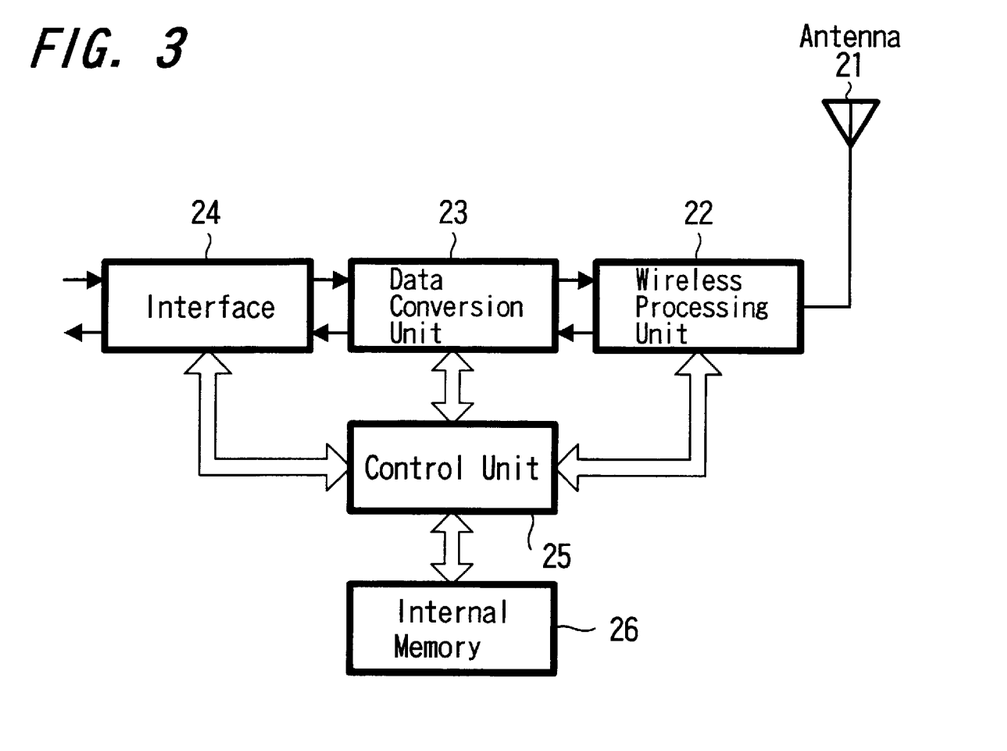
FIG. 3 is a block diagram showing an example of a configuration of a transmission apparatus according to one embodiment of the present invention.

In FIG. 3, there is shown a configuration example of the wireless transmission apparatuses 1 to 7 and 10 each configuring communication stations. In the figure, basically, the wireless transmission apparatuses 1 to 7 and 10 each are commonly configured (except that only a control configuration adapted to function as a central control station differs from other communication stations). These apparatus each are provided with an antenna 21 and a wireless processing unit 22 connected to the antenna 21, the wireless processing unit performing wireless transmission processing and wireless receiving processing, and is configured to enable wireless transmission with other transmission apparatuses. In this case, as a transmission system in which transmission and receiving are performed at the wireless processing unit 22 of this embodiment, for example, a transmission system using a multi-carrier signal called OFDM (Orthogonal Frequency Division Multiples) is applied. As a frequency used for transmission and receiving, for example, a very high frequency band (for example 5 GHz band) is used. In addition, in the case of this embodiment, a relatively weak transmission output is set. For example, for use in indoor, there is provided an output capable of wireless transmission in a relatively short distance from several meters to some tens of meters.

There is provided a data conversion unit 23 for performing data conversion of a signal received at the wireless processing unit 22 and data conversion of a signal to be transmitted at the wireless processing unit 22. The converted data at the data conversion unit 23 is supplied to a connected processor via an interface unit 24, and data to be supplied from the connected processing unit is supplied to the data conversion unit 23 via the interface unit 24, thereby enabling conversion processing.

Each unit in the wireless transmission apparatus is configured to execute processing based on control of a control unit 25 configured by micro-computers or the like. In this case, when the wireless processing unit 22 receives a control signal, the received control signal is supplied to the control unit 25 via the data conversion unit 23, and the control unit 25 sets each unit in a state indicated by the received control signal. In addition, a control signal to be transmitted from the control unit 25 to other transmission apparatus is supplied from the control unit 25 to the wireless processing unit 22 via the data conversion unit 23, thereby causing wireless transmission. When an asynchronous signal is received, the control unit 25 is constructed to judge a receiving timing of that synchronous signal, set a frame period based on the synchronous signal, and execute communication control processing at that frame period. In addition, an internal memory 26 is connected to the control unit 25 so that data required for communication control is temporarily stored in the internal memory 26.

Figure 4:
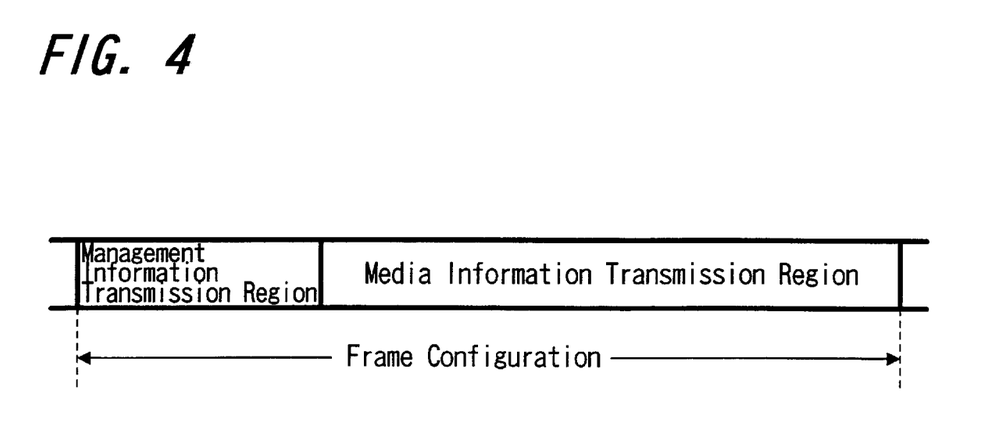
FIG. 4 is an illustrative view showing a frame configuration example according to one embodiment of the present invention.

FIG. 4 shows a configuration of signals to be transmitted among communication stations (wireless transmission apparatuses 1 to 7 and 10) in a network system of this embodiment. In this example, a configuration is such that a frame period is specified, thereby transmitting data. That is, as shown in FIG. 4, a predetermined single-frame period is specified, and a predetermined interval at the head of the single-frame period is defined as a management information transmission region. In addition, an interval other than the management information transmission region of each frame is defined as a media information transmission region. Various data is transmitted in this media information transmission region. In the case of this example, a configuration is such that data transmission in this media information transmission region is controlled by means of polling control from a central control station.

In the management information transmission region, management information common to the system is transmitted from the central control station 10. The management information to be transmitted includes synchronous data required to obtain frame synchronism in the network system, identification number data specific to the network system, and topology map data in the network, for example.

In the media information transmission region, data transfer (transmission) processing is performed among communication stations based on an access control of a central control station. The access control by this central control station is executed by means of polling control from the central control station, for example. In this polling control processing, the communication stations each are called in order from the central control station by means of a polling response request signal, and transmission is sequentially executed for each communication station.

In the communication station of identification number ID specified by the polling response request signal, when data to be transmitted is present, data transmission processing is performed immediately after the polling response request signal has been received. As the transmission processing is performed at this time, it is considered that data transfers is asynchronous transfer mode and synchronous transfer mode are used depending on type of data to be transmitted. With respect to the asynchronous and synchronous transfer modes, for example, the asynchronous transfer mode is used for transmission of relatively short data such as control data; and the synchronous transfer mode is used for transmission of data requiring real-time transfer such as video data or voice data. As such transmission control system using polling control, for example, a system conforming to IEEE1394 Standard is applicable.

Now, a data transmission processing state using polling control in the media information transmission region of each frame period in this embodiment will be described. Hereinafter, there will be described processing when polling control is performed for the communication station 7 that is a hidden transmission station incapable of directly making wireless communication with the central control station 10.

When the central control station 10 performs polling control for this communication station 7 that is a hidden terminal station, a communication station (branch station) that relays among the central control station 10 and the communication station 7 is selected, and transmission processing is performed via that branch station. A branch station capable of making wireless communication with both of the central control station 10 and the communication station 7 is selected. In the case of a network communication in a topology map shown in FIG. 2, the communication stations 3 and 6 can operate as branch stations.

When the central control station 10 recognizes the presence of the communication station that is a hidden terminal station by processing in the management information transmission region, and recognizes that the branch stations for that communication station 7 are the communication stations 3 and 6, in the case where polling control is performed for the communication station 7 from the central control station 10, the central control station 10 transmits relay polling information to the communication station 3 or 6. Such judgment of the hidden terminal station or selection processing for the branch station are performed by the control unit 25 of the transmission apparatus constituting the central control station 10. Here, it is assumed that the central control station 10 selects the communication station 3 as a branch station for the communication station 7.

Figures 5A, 5C:
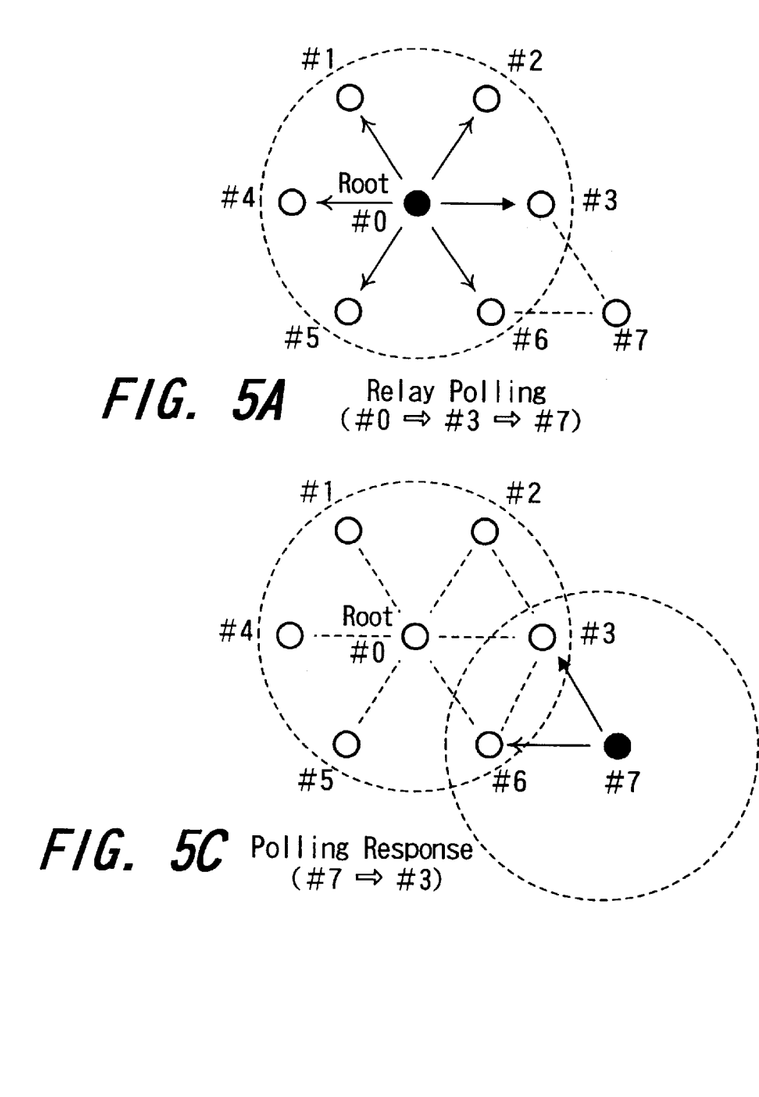
FIGS. 5A–5D are illustrative views showing transmission states according to one embodiment of the present invention.
Figure 6:
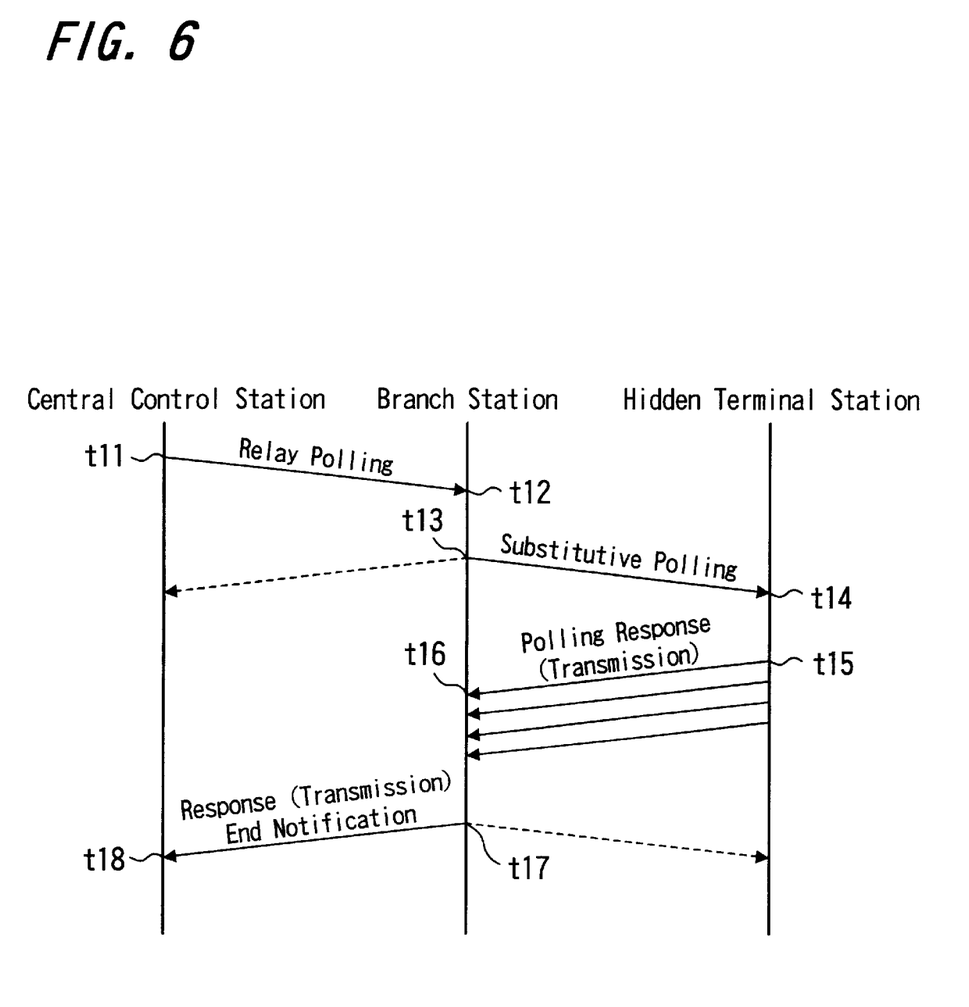
FIG. 6 is a sequence diagram showing an example of operation sequence according to one embodiment of the present invention (when a polling response is to a branch station)

FIG. 6 is a view showing an operation sequence in the above case. The central control station 10 defines the branch station 3 as an ID of a destination at a timing t11, and transmits relay polling information in which the ID of a destination performing polling control is defined as the terminal station 7. The branch station 3 receives the relay polling information at a timing t12. When the radio processing unit 22 of the branch station 3 receives the relay polling information, the control unit 25 of the branch station 3 judges the contents of the relay polling information. When the control unit 25 judges polling information to be relayed at this branch station 3, the polling information is temporarily stored in the internal memory 26. In FIG. 5, A is a view showing a transmission state of the relay polling information from the central control station 10 at this time, wherein the relay polling information is received by the communication stations 1 to 6 allocated around the central control station 10.

Figure 5B:
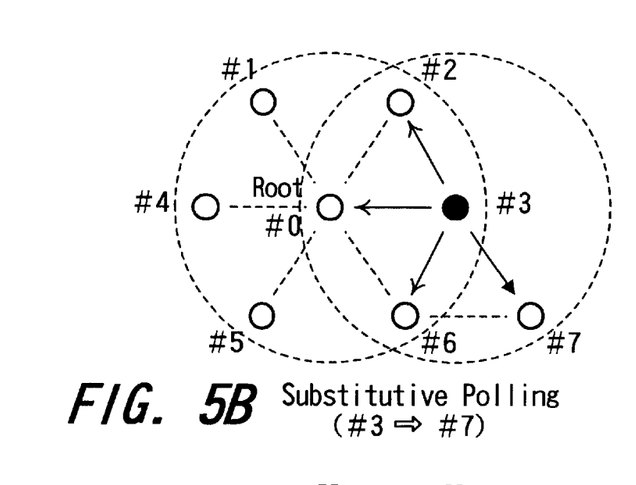

The stored relay polling information is defined as substitutive polling information of which the hidden terminal station 7 is defined as a destination ID. The information is transmitted from the radio processing unit 22 of the branch station 3 at a timing t13, and is received by the radio processing unit 22 of the hidden terminal station 7 at a timing t14. In FIG. 5, B is a view showing a transmission state of the substitutive polling information of the branch station 3 at this time, wherein the substitutive polling information is received by the communication stations 2, 6, 7, and 10 allocated around the branch station 3.

Where the communication station 7 that is a hidden terminal station receives the substitutive polling information, when there exists data to be transmitted from this communication station 7 to any of the communication stations in a network, a polling response is performed. That is, the communication station 7 performs data transmission as a polling response at a timing t15. Here, assuming that data is to be transmitted to the branch station 3, the data to be transmitted at this time is the data in which the communication station 3 is defined as a destination ID, and the data is received by the radio processing unit 22 of the branch station 3 at a timing t16. In FIG. 5, C is a view showing a data transmission state from the communication station 3 at this time, wherein the data to be transmitted is received by the communication stations 3 and 6 allocated around the communication station 7.

Figure 5D:
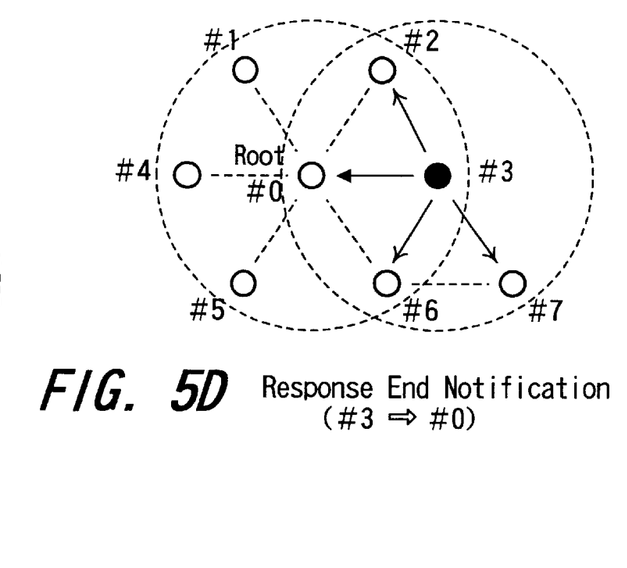

When the control unit 25 of this branch station 3 judges that data receiving as a polling response from the communication station 7 has completed at the communication station 3 that is a branch station, a response end notification is transmitted from the radio processing unit 22 at a timing t17 under the control of the control unit 25. The response end notification information is transmitted with the central control station 10 being a destination ID. The information is received by the radio processing unit 22 of the central control station 10 at a timing t18, and is judged by the control unit 25 of this central control station 10. FIG. 5, D is a view showing a transmission state of the response end notification information from the branch station 3 at this time, wherein the response end notification is received by the communication stations 2, 6, 7, and 10 allocated around the branch station 3. When the control unit 25 of the central control station 10 judges that the response end notification information has been received, polling control processing for the next communication station is ready.

Figure 7:
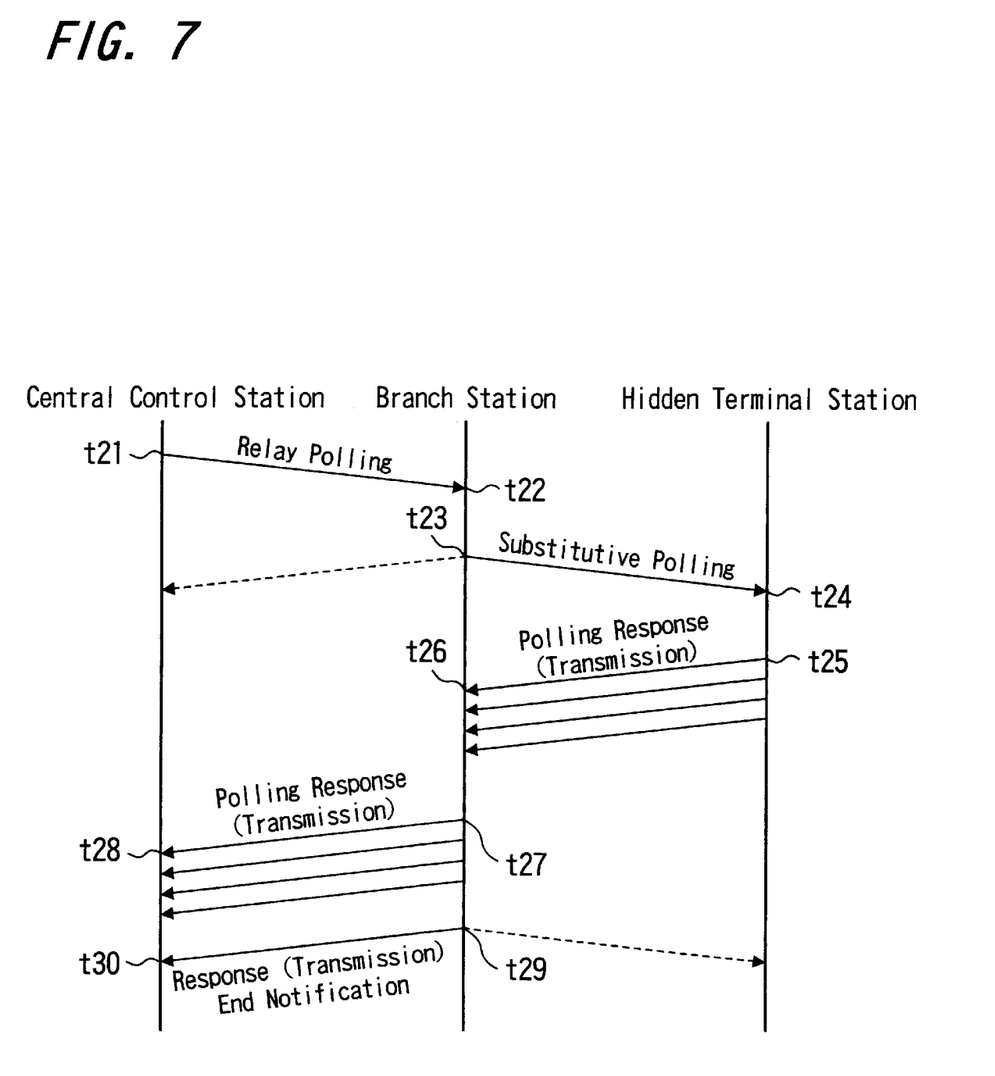
FIG. 7 is a sequence diagram showing an example of operation sequence according to one embodiment of the present invention (when a polling response is to a central control station)

When data received by the branch station 3 is transmitted from the communication station 7 to another communication station, the data is relay-transmitted from the branch station 3 to another communication station. For example, when data is transmitted from the communication station 7 to the central control station 10, the processing shown in FIG. 7 is performed. That is, the central control station 10 transmits relay polling information of which the branch station 3 is defined as a destination ID at a timing t21, and a hidden terminal station is defined as a destination ID, and the branch station 3 receives the relay polling information at a timing t22, and stores the information.

The stored relay polling information is defined as substitutive polling information of which a hidden terminal station 7 is defined as a destination ID. The information is transmitted from the radio processing unit 22 of the branch station 3 at a timing t23, and is received from the radio processing unit 22 of a hidden terminal station 7 at a timing t24. When the hidden terminal station 7 receives the substitutive polling information, data transmission as a polling response is performed from this communication station 7 at a timing t25. The data to be transmitted at the time is transmitted with the branch station 3 being a relay destination ID and with a final destination ID being the communication station 10, and is received by the branch station 3 at a timing t26.

When the branch station 3 judges that the received data at this time is data to be transmitted to the central control station 10, the data is temporarily stored in the internal memory 26. Then, the stored data is transmitted from the radio processing unit 22 at a timing t27 with the central control station 10 being a destination ID under the control of the control unit 25. The transmitted data is received by the central control station 10 at a timing t28, and is processed. When data transmission at this time has completed, the branch station 3 transmits response end notification information at a timing t29 with the central control station 10 being a destination ID. The response end notification information is received by the radio processing unit 22 of the central control station 10 at a timing t30, the reception is judged by the radio processing unit 22 of the central control station 10. When the control unit 25 of the central control station 10 judges that the response end notification information has been received, polling control processing for the next communication station is ready.

Now, processing for polling operation at the control unit 25 of each station according to the embodiment will be described with reference to a flow chart. First, the processing at the control unit 25 of the transmission apparatus constituting the central control station 10 will be described with reference to the flow chart of FIG. 8. The control unit 25 acquires information concerning a communication station performing next polling from predetermined data or the like (step 101). The control unit 25 judges whether or not the target communication station is a hidden terminal station incapable of directly making communication with the central control station from the acquired data (step 102). When it is judged not to be a hidden terminal station, the control unit 25 transmits general polling request information (step 103), and sets a timer for general polling request in the control unit 25 (step 104).

Figure 8:
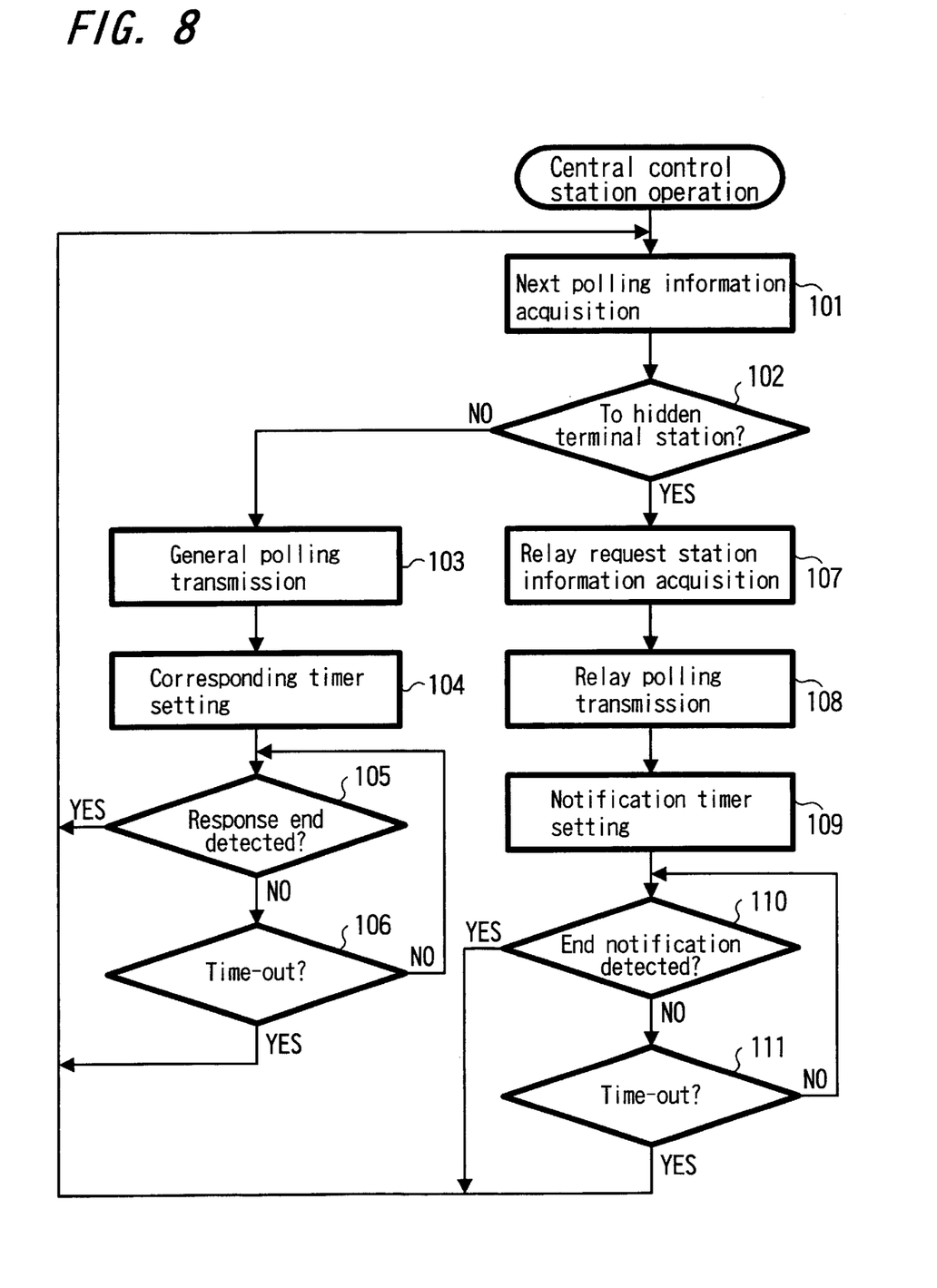
FIG. 8 is a flow chart showing an example of polling operation by the central control station according to one embodiment of the present invention.

After this timer setting, the control unit 25 judges whether or not polling response information for a polling response has been received (step 105), and judges whether or not the timer set in step 104 is timed out (step 106). In step 105, when it is judged that polling response information has been received, and when it is judged that the timer has been timed out in step 106, processing returns to step 101, and polling processing for the next communication station is ready.

When the control unit 25 judges polling for a hidden terminal station in step 102, it acquires information of a communication station (a branch station) to be requested for relay from predetermined data or the like (step 107). The control unit 25 judges a branch station from that acquired data, it transmits relay polling information for that branch station (step 108). At this time, a repay polling timer is set in the control unit 25 (step 109). This relay polling timer is a timer that judges that a time-out occurs a slightly longer time than that of the above mentioned general polling request timer is counted.

After this timer setting, the control unit 25 judges whether or not polling end notification information for a polling request has been received (step 110), and judges whether or not the timer set in step 109 is timed out (step 111). When the control unit 25 judges that polling end notification information has been received in step 110, and when the control unit 25 judges that the timer is timed out in step 111, processing returns to step 101, and polling processing for the next communication station is ready.

Now, processing at the control unit 25 of a transmission apparatus constituting a branch station performing relay will be described with reference to a flow chart of FIG. 9. When the control unit 25 judges that relay polling information has been received (step 121), it transmits substitutive polling information to a polling destination specified based on the relay polling information (step 122). At this time, a substitutive polling timer is set in the control unit 25 (step 123). This substitutive polling timer is a timer that judges that a time-out occurs when a substantially same time is counted as that when the above mentioned polling request timer is used.

After this timer setting, the control unit 25 judges whether or not polling response information for a substitutive polling request has been received (step 124), and judges whether or not the timer set in step 123 is timed-out (step 125). When the control unit 25 judges that polling response information has been received in step 124, and judges that a time-out occurs in step 125, it controls transmission of polling response end notification information (step 126).

Now, processing concerning a polling response at the control unit 25 of a transmission apparatus constituting a hidden terminal station will be described with reference to a flow chart of FIG. 10. First, the control unit 25 judges whether or not response information for a polling request (i.e., information to be transmitted by polling) exists (step 131). When no information to be transmitted exists, processing concerning a polling response is not performed. When information to be transmitted exists, the control unit 25 judges whether or not relay polling information of which the communication station is defined as a transmission ID has been received (step 132). When the relay polling information is not received, the control unit 25 performs receiving processing of substitutive polling information (step 133). When the substitutive polling information is received, the control unit 25 performs transmission processing of polling response information (step 137).

In addition, when the control unit has successfully received relay polling information in step 132, it can receive a signal from the central control station directly. In this case, the control unit 25 releases relay transmission via a branch station, and switches it to direct transmission processing (step 134). Next, the control unit judges whether or not substitutive polling information has been received (step 135). When the control unit 25 has received substitutive polling information, it goes to transmission processing of polling response information in step 137. In addition, when the control unit 25 cannot receive substitutive polling information in step 135, it waits until a response time for substitutive polling has elapsed, and then, goes to transmission processing of polling response information in step 137.

Figure 9:
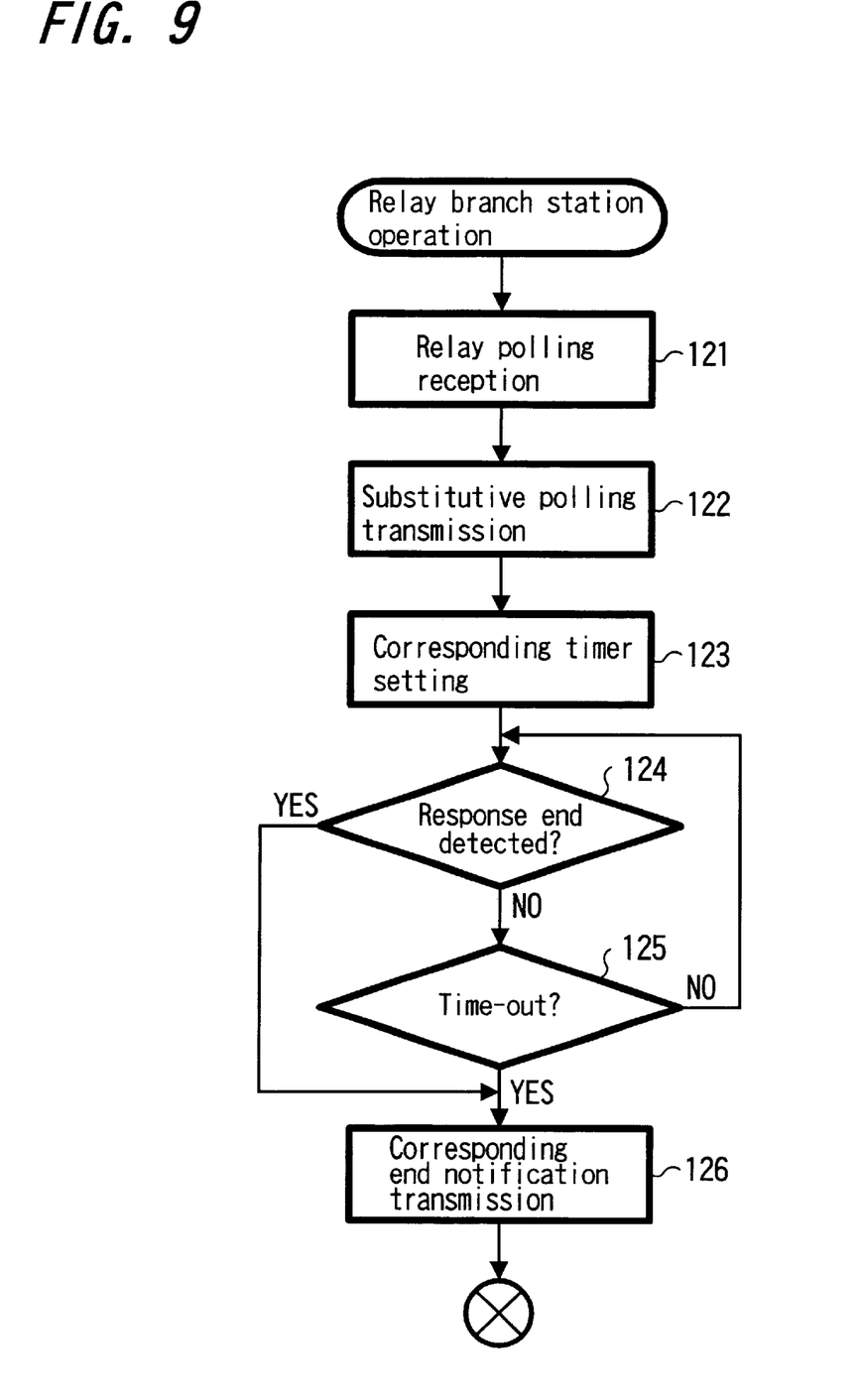
FIG. 9 is a flow chart showing an example of polling operation by a branch station according to one embodiment of the present invention.
Figure 10:
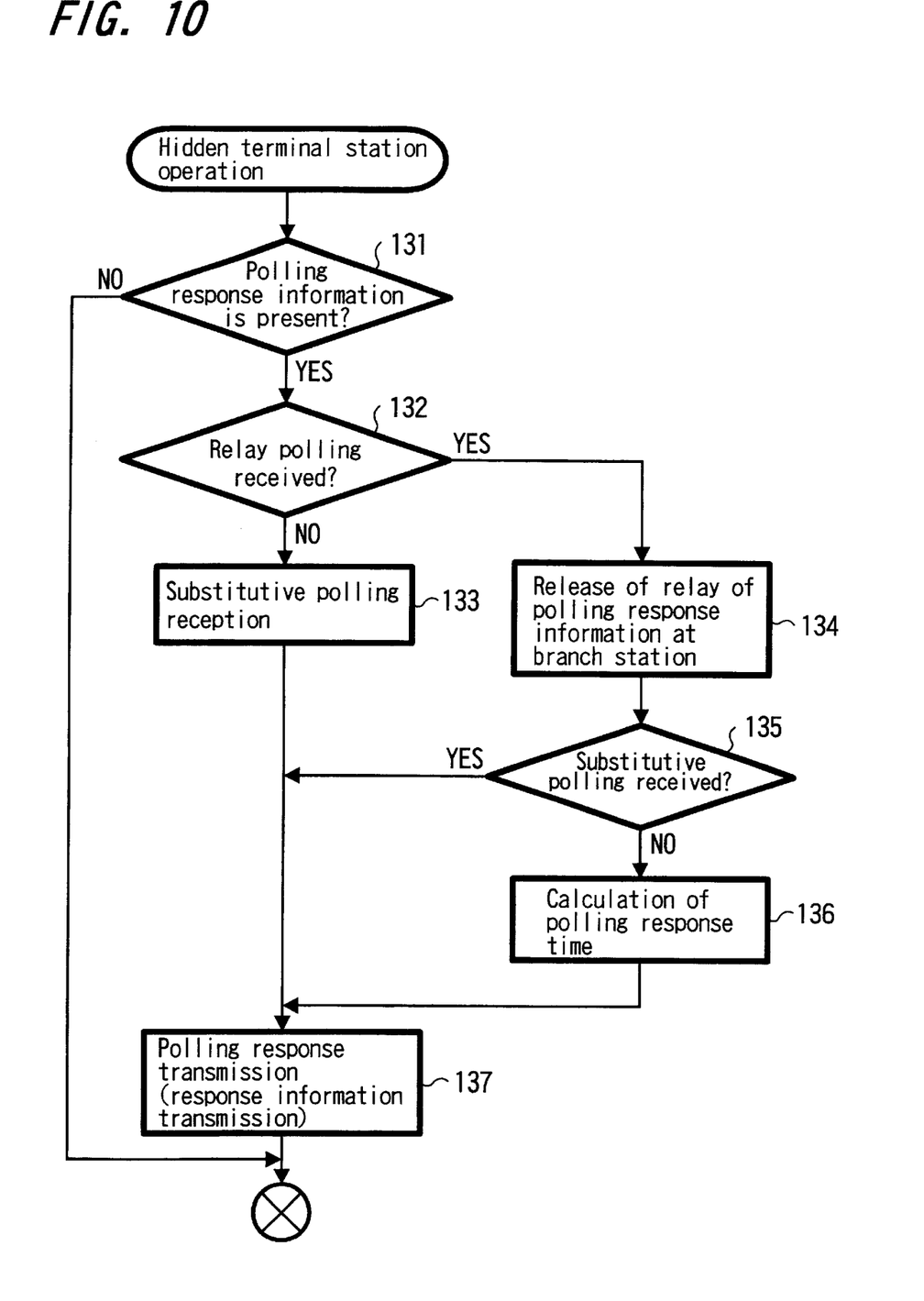
FIG. 10 is a flow chart showing an example of polling operation by a hidden terminal station (or a mobile station) according to one embodiment of the present invention.

Thus, as shown in FIG. 8, FIG. 9, and FIG. 10, the control unit 25 of each communication station performs control processing concerning polling transmission, thereby making it possible to perform proper relay polling processing for a hidden terminal station.

As shown in FIG. 10, when a polling signal from the central control station can be directly received on a hidden terminal station side, relay polling processing is released, thereby making it possible to take appropriate action even if the hidden terminal station is a mobile station moving in a network system.

Figure 11:
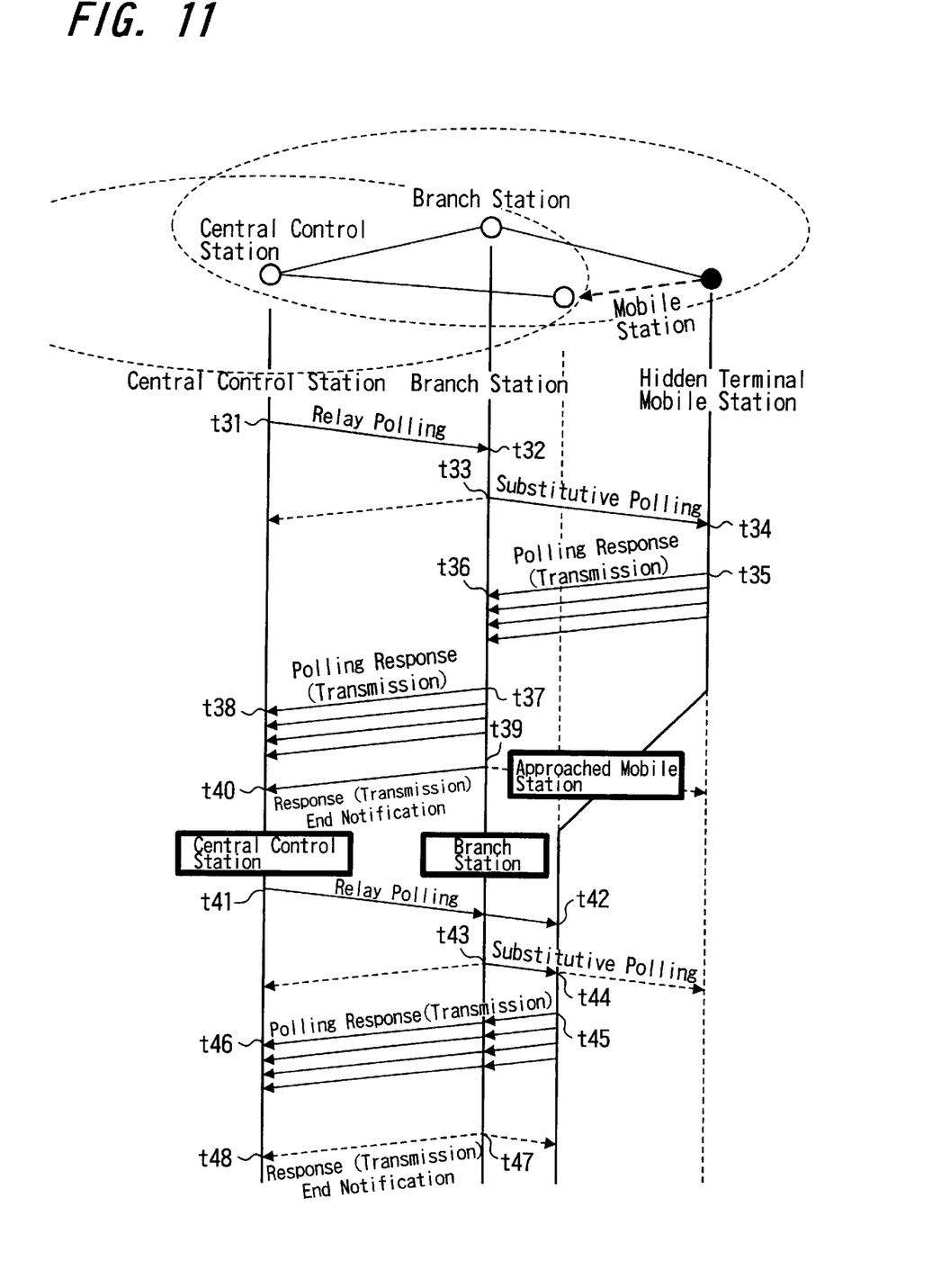
FIG. 11 is a sequence diagram showing an example of operation sequence according to another embodiment of the present invention (an example when a hidden terminal station moves, and can receive a polling control signal from the central control station directly)

In FIG. 11, there is shown an operation sequence when the communication station 7 is composed of a mobile station, and this communication station 7 moves from a state incapable of direct communication with the central control station 10 to a state capable of such communication.

Hereinafter, when a change in communication state is described with reference to FIG. 11, the central control station 10 transmits relay polling information to a branch station at a timing t31, and the branch station receives the relay polling information at a timing t32, and stores it.

The received and stored relay polling information by the branch station is defined as substitutive polling information of which a hidden terminal station is defined as a destination ID. The information is transmitted from the branch station at a timing t33, and is received by a hidden terminal station at a timing t34. When the hidden terminal station receives substitutive polling information, data transmission as a polling response from this hidden terminal station is performed at a timing t35. The data transmitted at this time is received by the branch station at a timing t36.

When the branch station judges that the received data at this time is data transmitted to the central control station, the data is temporarily stored in the internal memory. Then, the stored data is transmitted to the central control station at a timing t37. The transmitted data is received by the central control station at a timing t38. When data transmission at this time is completed, the branch station transmits response end notification information at a timing t39. The transmitted information is received by the central control station at a timing t40. This processing is the same as that shown in FIG. 7.

Hereinafter, until relay polling information for the same hidden terminal station has been transmitted, the hidden terminal station moves, and is placed in a state capable of directly making wireless communication with the central control station. At this time, when relay polling information for the branch station is transmitted from the central control station to the hidden terminal station at a timing t41, the relay polling information is received by the hidden terminal station at a timing t42, and is received by the branch station.

The branch station transmits substitutive polling information at a timing t43 after the relay polling information has been received and the hidden terminal station receives the substitutive polling information at a timing t44. At a timing t45 after the substitutive polling information has been received (or after a possible reception time has elapsed), the hidden terminal station transmits polling response information to the central control station, and the central control station receives the polling response information directly at a timing t46. In addition, the branch station transmits a response end notification at a timing t47, and the central control station receives the response end notification at a timing t48. When polling is done for a communication station in which the central control station is a hidden terminal station, general polling processing other than relay polling is performed.

In the above mentioned embodiment, although a branch station relaying polling information is defined as one communication station capable of communicating with a hidden terminal station, a plurality of communication stations may perform processing by the branch station. Thus, a plurality of communication stations perform processing to be done by branch stations, thereby making it possible to avoid failures of relay transmission due to movement of the hidden terminal station. For the communication stations performing processing to be done by branch stations, in the case of a network configuration of the topology map shown in FIG. 2, for example, all of the communication stations 3 and 6 capable of directly communicating with a hidden terminal station 7 are considered as performing processing to be done by branch stations. Alternatively, all of the communication stations 1 to 6 capable of directly communicating with the central control station 10 may perform processing to be done by the branch stations.

In addition, a station acting as a branch station may be variably set together with movement of a hidden terminal station.

Figure 12:
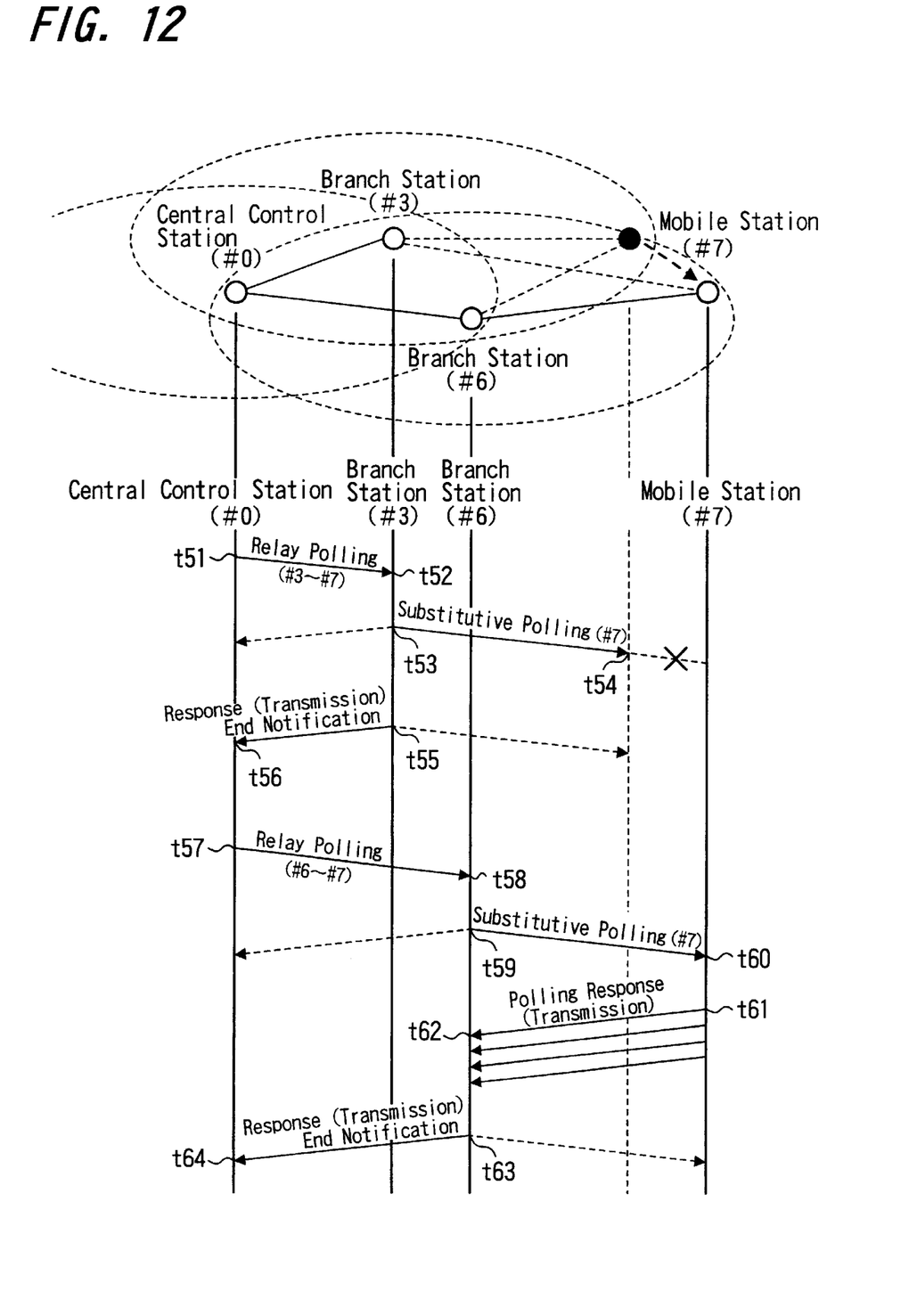
FIG. 12 is a sequence diagram showing an example of operation sequence according to another embodiment of the present invention (an example of relay operation by a plurality of branch stations).

In FIG. 12, an operation sequence example in this case is shown. That is, there is shown an example when a branch station is changed to another communication station 6 (identification number ID #6) together with movement of the hidden terminal station 7, in which the communication station 3 (identification number ID #3) has been first set as a branch station for the hidden terminal station 7 (identification number ID #7). In this example, first the central control station 10 transmits relay polling information to the branch station 3 at a timing t51, and the branch station 3 receives the information at a timing t52. By this reception, the branch station 3 transmits substitutive polling information to the hidden terminal station 7 at a timing t53. If the hidden terminal station does not still move, the substitutive polling information is received at a timing t54. As shown in FIG. 12, since the hidden terminal station 7 moves to the outside of an area capable of communication with the branch 3, there is no response from the hidden terminal station 7. The branch station 3 transmits a response end notification at a timing t55, and the central control station 10 receives the response end notification at a timing t56.

When the central control station 10 executes polling for the hidden terminal station 7, another communication station (communication station 6) transmits the specified relay polling information as a branch station at a timing t57 considering possibility of the movement of the hidden terminal station 7. When the communication station 6 receives the relay polling information at a timing t58, this communication station 6 is defined as a branch station, and transmits substitutive polling information at a timing t59. When the hidden terminal station 7 receives the substitutive polling information at a timing t60, a polling response is transmitted from the hidden terminal station 7 at a subsequent timing t61, and a branch station 6 receives the polling response at a timing t62.

When the branch station 6 receives the polling response, it transmits a response end notification at a timing t63. The response end notification is received by the central control station 10 at a timing t64. After this response end notification has been received, when the central control station 10 performs polling for the hidden terminal station 7, it specifies the communication station 6 as a branch station, and performs relay polling.

In this manner, a branch station performing relay polling is variably set, thereby making it possible to take appropriate action for movement of the hidden terminal station.

In processing according to the embodiments that have been described, although a communication station specified by the central control station performs relay processing to be done by a branch station, a communication station performing communication with the central control station may perform relay processing to be done by a branch station uniquely based on its judgment (i.e., judgment of state of communication stations existing around a communication station).

According to the present invention, even if information from the central control station cannot be received directly, a range capable of configuring a network can be broadened more without limiting the network configuration to a range capable of receiving a signal from the central control station performing polling control.

In particular, polling information required for using a polling method for transmission control can be transmitted to a hidden terminal station incapable of direct communication from the central control station via a branch station, thus enabling reliable transmission control.

In this manner, even if a signal from the central control station cannot be received directly, transmission control of that station can be performed. For example, even if a station moving arbitrarily in a network exists, transmission control can be reliably performed for that station. In addition, even if such station has moved to the outside of an electric wave arrival zone of the central control station, there is need for canceling such transmission, thus making it possible to ensure stable network operation.

Further, even if a signal of the central control station cannot be received temporarily due to factors such as movement of human being existing in a wireless communication network, there is no need for immediate disconnection from the network, thus making it possible to perform wireless transmission processing preferable for information transmission such as home and its transmission control.

In addition, the central control station performs relay polling via another station (branch station) for control of a network including a movable station as required, thereby making it applicable to transmission control of a station that moves in the network over a wide range.

When communication with a plurality of branch stations is enabled, the central control station performs relay polling via a plurality of branch stations capable of such communication, thereby enabling reliable transmission control.

Having described preferred embodiments of the invention with reference to the accompanying drawings, it is to be understood that the invention is not limited to those precise embodiments and that various changes and modifications could be effected therein by one skilled in the art without departing from the spirit or scope of the invention as defined in the appended claims.

What is claimed is:

1. A communication control method for controlling an access of wireless communication among a plurality of communication stations by a control station, comprising the steps of:

transmitting substitutive polling information intended for a destination communication station, incapable of directly making wireless communication with said control station, to a branch communication station;

storing the substitutive polling information in the branch communication station;

transmitting the stored substitutive polling information from the branch station to the destination communication station;

receiving a data transmission from the destination communication station at the branch station; and transmitting data from the branch station to the control station, whereby a communication network is formed by said branch station, said destination communication station, and said control station.

2. The communication control method as claimed in claim 1, wherein said step of storing includes said branch communication station performing relay processing by an instruction based on control information from said control station.

3. The communication control method as claimed in claim 1, wherein one of said plurality of communication stations recognizing the presence of a communication station incapable of directly making wireless communication with said control station performs relay processing as said branch communication station.

4. The communication control method as claimed in claim 1, wherein said branch communication station performing transmission of data from said destination communication station is composed of a plurality of communication stations, and said plurality of communication stations relay said access control information to said destination communication station at a same time.

5. A transmission apparatus in which communication is performed based on access control of a control apparatus, comprising:

receiving means located at a branch communication station for receiving access control information transmitted from said control apparatus;

storing means located at the branch communication station for temporarily storing said access control information received by said receiving means;

transmitting means for relay-transmitting said access control information stored by said storing means to a destination transmission apparatus;

wherein said receiving means receives a data transmission from said destination transmission apparatus and said transmitting means transmits the data from said destination transmission apparatus to said control apparatus, so that a communication network is formed by said branch communication station and said destination transmission apparatus, and said control station.

6. The transmission apparatus as claimed in claim 5, further comprising control means for controlling said relay transmission by the transmitting means based on control information from said control apparatus received by said receiving means of said branch communication station.

7. The transmission apparatus as claimed in claim 5, wherein said control means controls relay transmission by said transmitting means based on recognition results of a specific transmission apparatus incapable of directly making a wireless communication with said control apparatus.

* * * * *